(12) United States Patent
Hennink et al.

(10) Patent No.: US 8,938,144 B2
(45) Date of Patent: Jan. 20, 2015

(54) OPTICAL FIBER CABLE

(71) Applicant: Draka Comteq B.V., Amsterdam (NL)

(72) Inventors: Jan Hennink, Delfzijl (NL);
Jean-Pierre Bonicel, Rueil Malmaison (FR); Pascal Maria Willem Bindels, Woldendorp (NL)

(73) Assignee: Draka Comteq B.V., Amsterdam (NL)

(*) Notice: Subject to any disclaimer, the term of this patent is extended or adjusted under 35 U.S.C. 154(b) by 0 days.

(21) Appl. No.: 14/060,668

(22) Filed: Oct. 23, 2013

(65) Prior Publication Data

US 2014/0112630 A1    Apr. 24, 2014

(30) Foreign Application Priority Data

Oct. 23, 2012 (NL) .................................... 2009684

(51) Int. Cl.
*G02B 6/44* (2006.01)

(52) U.S. Cl.
CPC ............... *G02B 6/4434* (2013.01); *G02B 6/44* (2013.01); *G02B 6/441* (2013.01); *G02B 6/4429* (2013.01); *G02B 6/4413* (2013.01); *G02B 6/4438* (2013.01)
USPC ........... 385/113; 385/100; 385/101; 385/102; 385/103; 385/104; 385/105; 385/106; 385/107; 385/108; 385/109; 385/110; 385/111; 385/112; 385/114

(58) Field of Classification Search
CPC ........ G02B 6/44; G02B 6/441; G02B 6/4413; G02B 6/4434; G02B 6/4429; G02B 6/4438
USPC .................................................. 385/100–114
See application file for complete search history.

(56) References Cited

U.S. PATENT DOCUMENTS

| | | | |
|---|---|---|---|
| 5,343,549 A | 8/1994 | Nave et al. | |
| 5,835,658 A * | 11/1998 | Smith | 385/136 |
| 5,930,431 A | 7/1999 | Lail et al. | |
| 6,236,789 B1 | 5/2001 | Fitz | |
| 6,603,908 B2 * | 8/2003 | Dallas et al. | 385/109 |
| 6,859,592 B2 | 2/2005 | Seddon et al. | |
| 7,382,955 B1 | 6/2008 | Keller | |
| 8,391,658 B2 * | 3/2013 | Kachmar | 385/100 |
| 2003/0095763 A1 * | 5/2003 | Dallas et al. | 385/109 |
| 2003/0118299 A1 | 6/2003 | Seddon et al. | |
| 2003/0118300 A1 | 6/2003 | Seddon et al. | |
| 2007/0261880 A1 * | 11/2007 | Cox et al. | 174/138 F |
| 2009/0297102 A1 * | 12/2009 | Kachmar | 385/87 |

OTHER PUBLICATIONS

NL 2009684 Search Report dated Jul. 31, 2013.

* cited by examiner

*Primary Examiner* — Charlie Peng
*Assistant Examiner* — Guy Anderson
(74) *Attorney, Agent, or Firm* — Shumaker, Loop & Kendrick, LLP

(57) ABSTRACT

An optical fiber cable including, in a radial direction outward, a central strength member, a first layer of loose buffer tubes stranded around the central strength member, at least one of the loose buffer tubes of the first layer containing at least one light waveguide, an intermediate layer, a second layer of loose buffer tubes stranded around the intermediate layer, at least one of the loose buffer tubes of the second layer containing at least one light waveguide, and a jacket surrounding the second layer of loose buffer tubes, wherein the intermediate layer is formed of a material having a high coefficient of friction.

19 Claims, 1 Drawing Sheet

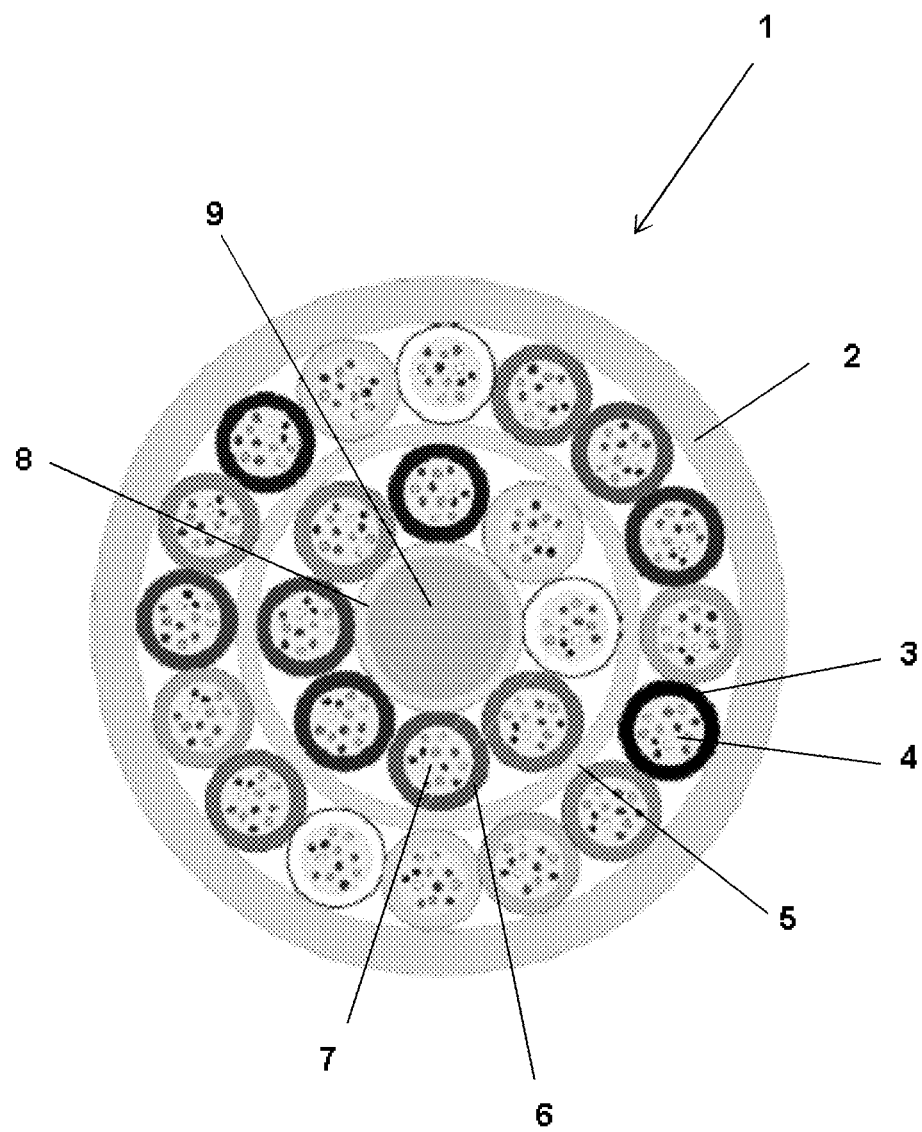

OPTICAL FIBER CABLE

TECHNICAL FIELD AND BACKGROUND OF THE INVENTION

The present invention relates to an optical fiber cable.

Optical fiber cables are used to transmit information including telephone signals, television signals, data signals, and for Internet communication. To preserve the integrity of the signal transported by optical fiber cables, certain design factors warrant consideration.

A typical high fiber count cable design includes an outer cable jacket, within which multiple loose tubes are arranged in layers around a central strength member. For example, a typical outer cable jacket may include eighteen loose tubes (one six tube layer and one twelve tube layer) to thirty six loose tubes (with an additional eighteen tube layer) therein. Within each loose tube, typically twelve optical fibers are loosely arranged. Loose tube optical fiber cables refer to an arrangement wherein multiple individual optical fibers inside the loose tubes are substantially un-connected to the tubes. Such an arrangement effectively bundles a large number of optical fibers into a relatively condensed outer jacket.

U.S. Pat. No. 7,382,955 relates to an optical fiber cable that has a plurality of loose tubes, each of which contain at least one optical fiber. The tubes are arranged in at least two layers, each of which are rotated in the same uni-helical direction, and where each of the at least two layers are arranged having substantially the same lay length. A jacket encases the loose tubes, such that a user, desiring access to any one of the optical fibers in one of the loose tubes, may open the jacket, untwist the at least two layers, access a desired loose tube and accompanying fiber contained therein and perform a desired splicing action.

U.S. Pat. No. 5,343,549 relates to an optical fiber cable comprising a central strength member covered by a flame resistant plastic material. Surrounding the central member is at least one layer of buffer tubes each containing a plurality of light waveguides and a filling compound. The cable outer jacket is made of a flame resistant plastic. The two layers of buffer tubes are stranded with reverse oscillating lay around coated central member.

U.S. Pat. No. 6,859,592 relates to a fiber optic cable, comprising: optical fibers disposed in buffer tubes, said buffer tubes defining at least two layers generally stranded about a center area of the cable; said buffer tube layers defining a relatively inner layer of buffer tubes being closer to said center area, and an outer layer of buffer tubes being relatively further from said center area, said inner and outer buffer tube layers each comprising a respective helix value, said respective helix values being substantially the same.

U.S. 2003/118,299 relates to optical fibers disposed in buffer tubes, said buffer tubes defining at least two layers generally stranded about a center area of the cable; said buffer tube layers defining a relatively inner layer of buffer tubes being closer to said center area, and an outer layer of buffer tubes being relatively further from said center area, said inner and outer buffer tube layers each comprising a respective helix value, said respective helix values being substantially the same. Water swellable tapes can be disposed adjacent the buffer tubes.

U.S. Pat. No. 5,930,431 relates to a fiber optic cable comprising: a cable core with at least one optical fiber; a layer of tape surrounding said cable core, said layer of tape comprising a seam; a seam guard placed adjacent said seam; a jacket surrounding said seam guard; said seam guard comprising a substrate operative to prevent cable zippering, and a waterblocker attached to said substrate, said waterblocker operative to inhibit the migration of moisture into said cable core, said seam guard being operative to perform dual functions of inhibiting both jacket zippering and the ingress of moisture into said cable core. The cable core includes a dielectric central member surrounded by a first set of buffer tubes which buffer tubes 23 are, in turn, surrounded by a water-blocking tape.

U.S. Pat. No. 6,236,789 relates to a cable including a central strength member, surrounded by a plastic insulation coating. Plastic buffer tubes, each of which loosely contains optical fibers, are stranded longitudinally along the length of the strength member. A flowable filling material, such as a water blocking compound, buffer tube filling material, oil or gel, fills the spaces within the buffer tubes which are not occupied by the fibers. One or more water swellable yarn is disposed longitudinally along the central strength member in the interstices between the stranded buffer tubes and the strength member. The buffer tubes are enclosed by an inner plastic jacket and electrical conductor units comprising electrical conductors in side-by-side relation are disposed around and along the longitudinal length of the inner plastic jacket and each of the conductors is surrounded by insulation, and the cable is provided with an outer sheath.

BRIEF SUMMARY OF THE INVENTION

The present invention is directed to an optical fiber cable including, from the center towards the periphery:

a central strength member;

a first layer of loose buffer tubes stranded around said central strength member, at least one of said loose buffer tubes of said first layer containing at least one light waveguide;

an intermediate layer;

a second layer of loose buffer tubes stranded around said intermediate layer, at least one of said loose buffer tubes of said second layer containing at least one light waveguide; and a jacket surrounding said second layer of loose buffer tubes, wherein said intermediate layer is formed of a material having a high coefficient of friction.

In an embodiment, the material forming said intermediate layer has a coefficient of friction of >0.4, measured according to test method ISO 8295-1995.

In another embodiment, the thickness of the intermediate layer is in the range of between 0.3 and 0.5 millimeters (mm).

In yet another embodiment, the first layer of loose buffer tubes is SZ stranded around the central strength member.

In yet another embodiment, the second layer of loose buffer tubes is SZ stranded around the intermediate layer.

In yet another embodiment, the intermediate layer is present in the form of a binder, a tape or an extruded layer of said material for forming the intermediate layer.

In yet another embodiment, the material forming said intermediate layer is selected from the group of thermoplastic material or a thermoplastic rubber material In yet another embodiment, the material forming said intermediate layer is a thermoplastic rubber material.

In yet another embodiment, the central strength element (also called central strength member) is formed of a fiber reinforced plastic material.

In yet another embodiment, one or more water blocking swellable yarns present around said central strength member, for example by means of stranding or winding and/or parallel to the longitudinal axis of the central strength member.

In yet another embodiment, at least 90% (preferably all) of said loose buffer tubes of said first and/or second layer, preferably of said first and second layer, contain at least one light waveguide.

In yet another embodiment, at least 90% (preferably all) of said loose buffer tubes of said first and second layer contain at least one light waveguide. In other words, at least 90% of all loose buffer tubes present within the optical fiber cable of the present invention contain at least one light waveguide (e.g. at least one optical fiber).

In yet another embodiment, one or more ripcords are present between said first layer of loose buffer tubes and said intermediate layer.

In yet another embodiment, one or more ripcords are present between said second layer of loose buffer tubes and said jacket.

In yet another embodiment, the outer diameter of said loose buffer tubes of said first layer is <1.9 mm (less than 1.9 millimeters).

In yet another embodiment, the outer diameter of said loose buffer tubes of said second layer is <1.9 mm (less than 1.9 millimeters).

In yet another embodiment, the outer diameter of said loose buffer tubes of said first and second layers is <1.9 mm (less than 1.9 millimeters).

In yet another embodiment, the outer diameter of said loose buffer tubes of said first layer is <1.7 mm (less than 1.7 millimeters).

In yet another embodiment, the outer diameter of said loose buffer tubes of said second layer is <1.7 mm (less than 1.7 millimeters).

In yet another embodiment, the outer diameter of said loose buffer tubes of said first and second layers is <1.7 mm (less than 1.7 millimeters).

In yet another embodiment, the outer diameter of said loose buffer tubes of said first layer is <than 1.6 mm (less than 1.6 millimeters).

In yet another embodiment, the outer diameter of said loose buffer tubes of said second layer is <than 1.6 mm (less than 1.6 millimeters).

In yet another embodiment, the outer diameter of said loose buffer tubes of said first and second layers is <1.6 mm (less than 1.6 millimeters).

In yet another embodiment, the wall thickness of said loose buffer tubes of said first layer is in the range of 0.2-0.5 mm (between 0.2 and 0.5 millimeters).

In yet another embodiment, the wall thickness of said loose buffer tubes of said second layer is in the range of 0.2-0.5 mm (between 0.2 and 0.5 millimeters).

In yet another embodiment, the wall thickness of said loose buffer tubes of said first and second layers is in the range of 0.2-0.5 mm (between 0.2 and 0.5 millimeters).

In yet another embodiment, the wall thickness of said loose buffer tubes of said first layer is in the range of 0.2-0.4 mm (between 0.2 and 0.4 millimeters), preferably in the range of 0.2-0.25 mm, more preferably 0.225 mm.

In yet another embodiment, the wall thickness of said loose buffer tubes of said second layer is in the range of 0.2-0.4 mm (between 0.2 and 0.4 millimeters), preferably in the range of 0.2-0.25 mm, more preferably 0.225 mm.

In yet another embodiment, the wall thickness of said loose buffer tubes of said first and second layers is in the range of 0.2-0.4 mm (between 0.2 and 0.4 millimeters), preferably in the range of 0.2-0.25 mm, more preferably 0.225 mm.

In yet another embodiment, each loose buffer tube of said first layer contains at least ten optical fibers.

In yet another embodiment, each loose buffer tube of said second layer contains at least ten optical fibers.

In yet another embodiment, each loose buffer tube of said of said first and second layer contains at least ten optical fibers.

In yet another embodiment, said optical fibers are bend insensitive single mode optical fibers (BI-SMF).

In yet another embodiment, the present optical fiber cable comprises no metallic parts.

In yet another embodiment, the outer diameter of said optical fiber cable is in the range of 8-12 mm (between 8 and 12 millimeters).

In yet another embodiment, the outer diameter of said optical fiber cable is in the range of 9-11 mm (between 9 and 12 millimeters).

In yet another embodiment, the number of loose buffer tubes in the first layer of loose buffer tubes is between 6 and 10 (i.e., 6, 7, 8, 9, or 10).

In yet another embodiment, the number of loose buffer tubes in the second layer of loose buffer tubes is between 12 and 20 (i.e., 12, 13, 14, 15, 16, 17, 18, 19, or 20).

In yet another embodiment, said optical fibers are coated with a UV curable resin.

In yet another embodiment, said optical fibers coated with a UV curable resin (coated optical fibers) have an outer diameter of 250+/−15 microns (between 235 and 265 microns), or 200+/−10 microns (between 190 and 210 microns).

One or more of the aims of the invention are obtained by one or more of the above embodiments. It should be noted that the embodiments cited above can also be used in combination to each other to create other embodiments, all falling within the scope of the present invention.

BRIEF DESCRIPTION OF THE DRAWING

FIG. 1 is a sectional view of a stranded loose tube buffer cable according to an embodiment of the invention.

DETAILED DESCRIPTION OF THE INVENTION

The terms "loose buffer tube" or "buffer tube" or "loose tube" are used synonymously herein to describe a cable part (e.g., an optical fiber cable part). A loose buffer tube is an extruded tube of a thermoplastic material. A loose buffer tube is intended to contain one or more optical fibers, typically twelve optical fibers. In a loose buffer tube the optical fiber(s) are generally loosely arranged inside said tube. In other words, the optical fibers are not stranded inside said tube.

Examples of thermoplastic materials that are particularly suitable for loose buffer tubes are polyolefins (PO), polybutylene terephthalate (PBT) or polyamide (PA). Preferably, PBT is used. PBT is a semi crystalline material that is especially suitable for the construction of loose buffer tubes. It combines sufficient strength and flexibility that are required for these loose buffer tubes. The loose buffer tubes can be constructed in either a single layer or double layer construction. Loose buffer tubes are generally made from materials having a low friction coefficient. Such a low friction coefficient allows the optical fibers to move freely within the loose buffer tube. Moreover, such a low friction coefficient allows two adjacent loose buffer tubes to move slightly with respect to each other without friction limiting said movement; this allows the optical fiber cable in which these loose buffer tubes are present to be bent. All possible embodiments described above for loose buffer tubes may be combined.

The term "optical fiber" is used herein to describe an optical fiber having a light conducting core and cladding made of glass. Said core and cladding are surrounded by a protective coating (preferably in a single or dual layer). Said coating preferably being a UV curable resin. One or more of the coating layers may be colored to increase the ease of identification. Optionally, optical fibers may be provided with an additional colored ink layer at the outer circumference (e.g., surrounding said coating layers).

The term "between" in connection with ranges also includes the end points of the cited ranges.

The term "fiber reinforced plastic material" (also fiber-reinforced polymer or FRP) is used herein to describe a composite material made of a polymer matrix that is reinforced with fibers. The fibers are usually glass, carbon, or aramid, although other fibers may be used. The polymer is usually an epoxy, vinylester or polyester thermosetting plastic, and phenol formaldehyde resins are still in use. In the present invention, the FRP material is used to construct or form the central strength element. Preferably, a central strength member prepared of a polyester resin comprising 80 weight % or more of glass fibers is used.

The term "thermoplastic material" is used herein to describe a material that becomes pliable or moldable above a specific temperature, and returns to a solid state upon cooling. These materials are also known as "thermosoftening plastics." They are generally polymeric materials.

The term "thermoplastic rubber material" is used herein to describe thermoplastic elastomers (TPE), which are a class of copolymers or a physical mix of polymers (usually a plastic and a rubber) that include materials with both thermoplastic and elastomeric properties.

The term "SZ stranding" is used herein to describe reverse oscillating lay stranding of buffer tubes. SZ stranding and reverse oscillating lay stranding are well known to skilled person.

Conventional double layer SZ cables are constructed of two separate layers of loose buffer tubes that are stranded around a central element. A first layer of loose buffer tubes is SZ stranded and on top of this a second layer of loose buffer tubes is SZ stranded.

These conventional SZ cables use thick walled loose buffer tubes. The reason for this is that the tubes must be strong enough to prevent deformation thereof caused by the forces acting on the tubes during manufacturing or installation of the cable. The layers of the stranded loose buffer tubes are held in place (viz. the loose buffer tubes are kept together) by using one or more binders (e.g. yarns) that are wrapped around the layers of stranded loose buffer tubes. These binders are applied with a high tension in order to prevent rotation or displacement of the buffer tubes during manufacturing or installation of the cable.

To withstand the forces for keeping the layers together these tubes are also strong enough to withstand local pressures at the points were buffer tubes of the different layers cross each other. In order to withstand the forces applied by the binders with the purpose of keeping the loose buffer tubes together in the layers, a certain wall thickness of the loose buffer tubes is required. These thick walled loose buffer tubes are then also strong enough to withstand any local pressures that occur at the points were loose buffer tubes of the different layers cross each other.

Without wishing to be bound to a particular theory, the following is observed. On the reversal points of the SZ stranding (the point where the layer of tubes are stranded from clockwise to counter clock wise or vice versa) the tubes may rotate as a consequence of shrinkages after the extrusion or as a consequence of external forces such as the bending of the cable. Generally, this is prevented by winding binders with high force around a layer of tubes. However, if the second layer of tubes is bound by means of a binder with high force onto the first layer of tubes, the highest forces occur on the points where the tubes of the two layers cross each other. Thick-walled tubes are required to be able to withstand these high forces.

When loose buffer tubes having decreased wall thicknesses and hence small outer diameters are used in optical fiber cables with the aim to reduce the optical fiber cable's outer diameter, the strength of these loose buffer tubes is generally insufficient to withstand the forces that are applied upon the optical fiber cable during the manufacturing or installation thereof or when said optical fiber cable is exposed to temperature differences during operation thereof. The loose buffer tubes that are present in double layers stranded construction may move with respect to each other and with respect to the outer jacket or the central strength element or they may rotate and kink. Such movement will cause stresses on the optical fibers that are present within these loose buffer tubes. Such stresses upon optical fibers may lead to increased attenuation, which is undesirable.

The present inventors have found that in a double layer SZ stranded type of optical cable (viz. an optical fiber cable having two separate layers of stranded loose buffer tubes) the second or outermost layer of stranded loose buffer tubes is often not stable (viz. has positional freedom or movement) on the first (innermost) layer of stranded loose buffer tubes. In other words, the loose buffer tubes that are present in the second layer may rotate at the reverse points of the SZ stranding when the optical fiber cable is submitted to thermal cycles (e.g. during operation) and consequently the optical fibers that are present within these second layer of loose buffer tubes may experience more stress and consequently, the attenuation of the optical fibers may increase, which is undesirable.

Accordingly, there is a need to produce a large capacity (viz. with a large number of optical fibers) double layer stranded loose buffer tube optical fiber cable, said cable having a small outer diameter and which cable does not suffer from the drawbacks described above.

The present invention provides an optical fiber cable including, from the center towards the periphery:
  a central strength member;
  a first layer of loose buffer tubes stranded around said central strength member, at least one of said loose buffer tubes of said first layer containing at least one light waveguide;
  an intermediate layer;
  a second layer of loose buffer tubes stranded around said intermediate layer, at least one of said loose buffer tubes of said second layer containing at least one light waveguide; and
  a jacket (also called an outer sheath) surrounding said second layer of loose buffer tubes; wherein said intermediate layer is formed of a material having a high coefficient of friction.

The intermediate layer is placed between two successive layers of loose buffer tubes.

The optical fiber cable including the intermediate layer with a high friction coefficient allows for one or more of the aforementioned objects to be achieved.

The inventors, without wishing to be bound by a theory, assume that due to the high friction coefficient of the intermediate layer the loose buffer tubes of the second layer (that are in contact with the high friction intermediate layer) are kept in place (are able to hold their spatial position) better than in a prior art optical fiber cable construction wherein this intermediate layer is not present. In other words, the high friction intermediate layer prevents the movement of the loose buffer tubes present in the second layer with respect to each other and the second layer in total with respect to the first layer in total. This reduced movement will also reduce the number of rotations or kinks and hence make sure that an increase in attenuation is partially of fully prevented. Moreover, in an optical fiber cable construction with an intermediate layer having a low friction coefficient, i.e. a friction coefficient lower than 0.4 as measured according to the test method of ISO 8295-1995, the buffer tubes will deform during installation or after installation due to temperature changes. Upon deformation of the buffer tubes the optical fibers will be pinched resulting in high attenuation losses, which is highly undesirable.

This prevention of movement brought about by the intermediate layer of the present invention is particularly true at the reverse points of the SZ stranding where the loose buffer tubes may rotate more easily compared to other points in the stranded loose buffer tubes.

In an embodiment, the optical fiber cable according to the present invention can include 288 fibers (e.g. 24 loose buffer tubes each having 12 optical fibers). However, any other fiber count is possible with the present invention.

A drawback that the present inventors have discovered of prior art optical fiber cable design is that in a design in which the second layer of buffer tubes is directly stranded on the first layer of loose buffer tubes, the loose buffer tubes in the second layer rotate at the reverse point of the SZ stranding when the loose buffer tubes shrink longitudinally, e.g. due to temperature variations.

Another drawback is that in the case of a small outer diameter optical fiber cable design in which the second layer of buffer tubes is directly stranded on the first layer of buffer tubes with binders surrounding the second layer of buffer tubes to prevent rotation of the buffer tubes at the reverse points, the wrapping force of the binders needed to prevent movement or rotation of the buffer tubes is too high, causing the buffer tubes to deform due to local pressures at the points were buffer tubes of the different layers cross each other. In other words, the binders have a negative effect locally on the loose buffer tubes.

The present inventions have solved this problem according to the prior art by the introduction of an intermediate layer having a high coefficient of friction between the first layer of buffer tubes and the second layer of buffer tubes. One function of the intermediate layer according to the present invention is to avoid moving and rotation of the second layer of buffer tubes on (i.e., with respect to) the first layer of buffer tubes.

The intermediate layer is preferably made of a binder, tape, or an extruded layer. Most preferably, the intermediate layer is an extruded layer. The intermediate layer can be formed of a thermoplastic material or thermoplastic rubber material with high friction coefficient. Preferably, a thermoplastic rubber material is used.

In one embodiment, the intermediate layer is a thin layer. "Thin layer" is preferably meant having a wall thickness that ranges between 0.3-0.5 mm. In other words, the thickness (radial thickness or wall thickness) of the intermediate layer is between 0.3 and 0.5 millimeters. When using a tape as intermediate layer the present inventors found that the strength of a tape having a layer thickness less than 0.3 mm is insufficient whereby such a tape layer can not be applied with enough winding force around the first layer of buffer tubes. In another embodiment, when applying an intermediate layer through extrusion, it is necessary that the extrusion applied intermediate layer is free of holes and gaps. Therefore, the wall thickness of the intermediate layer ranges between 0.3-0.5 mm.

In one embodiment, the intermediate layer has a friction coefficient that is higher than 0.4 as measured according to the test method of ISO 8295-1995. The test sample was conditioned during 16 hours at a temperature of 23° C. at a relative humidity of 50%. The speed of the test sample during the test was 100 mm/min±10 min/min.

One example of material suitable for the intermediate layer is an extruded layer of a thermoplastic material such as Hytrel®. Other examples include compositions comprising EPDM rubber (ethylene propylene diene monomer (M-class) rubber), such as Santoprene®. Other thermoplastic materials that provide a high friction coefficient may be used.

In one embodiment, the first layer of loose buffer tubes is SZ stranded around the central strength member. In another embodiment, the second layer of loose buffer tubes is SZ stranded around the first layer of buffer tubes. In yet another embodiment, both layers are SZ stranded. The SZ stranding enables easy removal of buffer tubes from cables in the reversal points.

Preferably, both the outer surface of said intermediate layer in contact with the loose buffer tubes in the second layer as well as the inner surface of said intermediate layer in contact with the loose buffer tubes in the first layer have high friction. This can for example, be achieved when the intermediate layer is fully made out of a high friction coefficient material. All embodiments disclosed above about the intermediate layer apply to either the inner or outer surface or both surfaces of said intermediate layer.

The loose buffer tubes may further contain a water absorbing gel compound within the central cavity that is formed by the wall of the loose buffer tubes. In case such a gel compound is present, the one or more optical fibers as may be arranged in the gel, viz. freely moving in the gel. Said gel compound is preferably a non-toxic and dermatological safe gel compound.

The central strength element preferably includes a fiber reinforced plastic material. Suitable fiber reinforced plastic materials and methods for preparing such central strength elements are well known. Optionally, water blocking and/or water swellable yarns may be provided stranded around said central strength element. In one embodiment, two water blocking yarns are provided around the central strength member. One of the two is provided parallel to the longitudinal axis of the central strength member, whereas the other waterblocking yarn is stranded around the arrangement (of CSM and one waterblocking yarn) in a helical winding, preferably a loose or open helical winding.

At least 90% of said loose buffer tubes (of either only the first, only the second, or the first and second layers) contain at least one light waveguide, e.g. at least one optical fiber.

In a preferred embodiment, all loose buffer tubes (of either only the first, only the second, or the first and second layers) contain one or more optical fibers. Each loose buffer tube may contain at least ten optical fibers or, for example, twelve optical fibers.

It is envisioned that a different number of optical fibers is present in the loose buffer tubes in the first layer than the loose buffer tubes in the second layer. It is also envisioned that there is a difference in the number of optical fibers present in the loose buffer tubes within each layer.

It is preferred that the number of optical fibers present in each of the buffer tubes within the same layer is the same.

For gaining access to the optical fibers that are present within the loose buffer tubes in the outermost or second layer, one or more ripcords may be present between said second layer of loose buffer tubes and said jacket. This allows using the opening of the jacket to gain access to the loose buffer tubes. These loose buffer tubes may then be opened in a conventional manner (such as for example with a knife or specialized tool) to gain access to the optical fibers within.

For gaining access to the optical fibers that are present within the loose buffer tubes in the innermost or first layer, one or more ripcords may be present between said first layer of loose buffer tubes and said intermediate layer. This allows the opening of the intermediate layer to be used to gain access to the loose buffer tubes. These loose buffer tubes may then be opened in a conventional manner to gain access to the optical fibers within.

In the optical fiber cable according to the present invention, the outer diameter of said loose buffer tubes is preferably <1.9 mm, more preferably <1.7 mm, even more preferably less than 1.6 mm.

The effect of the above is that an optical fiber cable having a smaller diameter is obtained which has significant advantages in the field. The inventive cable can, for example, be used in small ducts.

It is preferred that the outer diameter of the loose buffer tubes in one single layer, or in both layers, is the same. For example, it is preferred that all the buffer tubes of the first layer have the same outer diameter. Moreover, it is preferred that all the buffer tubes of the second layer have the same outer diameter. However, the outer diameter of the loose buffer tubes of the first layer may be different to the outer diameter of the loose buffer tubes of the second layer.

In the optical fiber cable according to the present invention, the wall thickness of said loose buffer tubes is preferably in the range of 0.2-0.5 mm, preferably in the range of 0.2-0.4 mm. In other words, the wall thickness of the loose buffer tube is preferably between 0.2 millimeter and 0.5 millimeter, more preferably between 0.2 millimeter and 0.4 millimeter.

It is preferred that the wall thickness of the loose buffer tubes in one single layer or in both layers is the same. For example, it is preferred that all the buffer tubes of the first layer have the same wall thickness. Moreover, it is preferred that all the buffer tubes of the second layer have the same wall thickness. However, the wall thickness of the loose buffer tubes of the first layer may be different to the wall thickness of the loose buffer tubes of the second layer.

The effect of a smaller wall thickness, is that with the same inner diameter, a smaller outer diameter is obtained for the loose buffer tubes. In other words, the same number of optical fibers can be housed while the optical fiber cable becomes smaller.

The buffer tubes are preferably made of polymers having a low friction coefficient. Examples of thermoplastic materials that are particularly suitable for loose buffer tubes are polyolefins (PO), polybutylene terephthalate (PBT) or polyamide (PA) (see above).

The preferred optical fibers for use in the present invention are so called "bend insensitive single mode optical fibers" (BI-SMF) that comply with the requirements of the ITU-T G.657A1 standard.

Optical fibers complying with this ITU-T G.657A1 standard are required to have a macrobending loss of 1.0 dB or less at 1625 nm, when wrapped ten times around a mandrel with 15 mm radius.

The present optical fiber cable design is especially suitable for optical fibers that are marketed by the present applicant under the trade name of BendBright® (viz, a fiber compliant with ITU-T G.657.A1) and BendBright®-XS (viz. a fiber compliant with ITU-T G.657.A2&B2).

These two commercially available bend-insensitive optical fibers (BendBright® and BendBright®-XS) provide a bend-sensitivity reduction of ten times (×10) and a hundred times (×100), respectively, as compared to a standard single-mode fiber (SSMF) (viz. a fiber compliant with ITU-T G.652).

These two commercially available bend-insensitive optical fibers (BendBright® and BendBright®-XS) are fully compliant with the most stringent ITU-T G.652.D recommendation.

In addition, the present applicant also markets BendBright®-Elite (viz. a fiber compliant with ITU-T G.657.B3) which is very suitable for use in the present invention. BendBright®-Elite is an ultra bend-insensitive optical fiber especially suited for tighter radii high end specialty operations. BendBright®-Elite permits the use of one optical fiber type from the central office to the optical network terminal.

The optical characteristics of all the different types of BendBright® fibers have been obtained by the present applicant by changing the refractive index profile of the optical fiber by the addition of a (buried) trench having a lowered refractive index (with respect to the outer optical cladding) in the cladding area. This buried trench confines the optical signal (field) to the core region when the optical fiber is bent and provides a high bit rate, and a high wavelength operation for FTTH (fiber to the home) systems.

The optical fibers for use in the present invention are generally provided with a coating. The outer diameter of the coated optical fibers is preferably 250+/−15 microns, or 200+/−10 microns. In other words, between 235 and 265 microns or between 190 and 210 microns. The 200 micron embodiment is selected in case a more compact cable is required. The inner diameter of the loose buffer tube may be selected to be of a lower value while still being able to house the same number of optical fibers. In other words, the lower diameter of 200+/−10 microns allows increasing the number of fibers present in a buffer tube. The range of +/−15 for the 250 micron embodiment and the range of +/−10 for the 200 micron embodiments are ranges that relate to the manufacturing tolerance.

The optical fiber cable according to the present invention preferably does not contain metallic parts within the jacket. In other words, there are no metallic parts present in the total optical fiber cable in this specific embodiment. Examples of metallic parts that could be present in prior art cables and that are preferably not present in the optical fiber cable according to the present inventions are strengthening elements or tapes or yarns.

The outer diameter of the present optical fiber cable is preferably in the range of 8-12 mm, more preferably 9-11 mm.

The technical effect of this characteristic is that a smaller optical fiber cable takes up less space. This is advantageous in applications where a small amount of space is available.

The number of loose buffer tubes in the first layer of loose buffer tubes is preferably between 6 and 10.

The number of loose buffer tubes in the second layer of loose buffer tubes is preferably between 12 and 20.

A commercially marketed optical fiber cable has to provide a certain capacity (viz, a certain number of optical fibers). This was taken as a starting point for the present inventors to design a cable having the optimum properties of maximal capacity on the one hand and minimal outer diameter on the other hand.

An embodiment of the present invention, being a stranded loose buffer tube "mini" cable suitable for use in ducts, will now be discussed in detail. The embodiment shown here should not be regarded as limiting the scope of the invention.

FIG. 1 shows a stranded loose buffer tube cable 1 according to an embodiment of the invention suitable for use in ducts. A central strength member 9 is provided consisting of a fiber reinforced plastic surrounded by stranded water blocking swellable yarns 8. Around this central strength member 9 is stranded a first layer of eight loose buffer tubes 6. Optical fibers 7, especially bend insensitive single mode optical fibers (BI-SMF), are present in loose buffer tubes 6. Optical fibers 7 are uniquely identified by color; in other words, each of the optical fibers 7 has a different color. The walls of the loose buffer tube 6 are formed a high tensile strength thermoplastic material (PBT) and having a wall thickness of 0.225 mm. The first layer of buffer tubes 6 is surrounded by an intermediate layer 5 made of a material having a high coefficient of friction, i.e. a coefficient of friction of >0.4, measured according to test method ISO 8295-1995.

The second layer of sixteen loose buffer tubes 3 is stranded around intermediate layer 5. Optical fibers 4 are present in loose buffer tubes 3. These optical fibers 4 are for example bend insensitive single mode optical fibers (BI-SMF) and uniquely identified by a different color, as discussed above the first layer.

Surrounding said second layer a jacket or outer sheath 2 is provided. Said outer sheath 2 is made of high density polyethylene (HDPE) and it encloses the second layer of loose buffer tubes 3. The first and second layer of loose buffer tubes 3, 6 are stranded according to the SZ mode around the central strength member 9. The loose buffer tubes 3, 6 are filled with a non-toxic and dermatological safe gel compound.

Aramid yarns serving as ripcords are positioned between the intermediate layer 5 and the first layer of loose buffer tubes 6, and between the outer sheath 2 and the second layer of loose buffer tubes 3.

The optical fiber cable as shown in the fiber contains 288 optical fibers. The first layer comprises eight loose buffer tubes and the second layer comprises sixteen loose buffer tubes, totaling to 24 loose buffer tubes, each comprising 12 optical fibers.

The outside diameter of the cable 1 is approximately 10.5 mm. The outer diameter of each of the loose buffer tubes 3,6 is between 1.2 and 1.9 millimeter.

The present invention refers especially to optical cables having reduced diameters and consequently to buffer tubes having a reduced diameter and wall thickness. It is to be noted that problems related to deformation of buffer tubes do not exist at optical cables having high strength, i.e. optical cables having high diameters and high wall thicknesses.

The present invention is further more illustrated by the appended claims. It should be noted that all of the embodiments cited in the description as well as the claims may be combined with each other in all possible combinations and still fall within the scope of the claims.

What is claimed is:

1. An optical fiber cable, comprising: a central strength member; a first layer of loose buffer tubes stranded around the central strength member, at least one of the loose buffer tubes of the first layer containing at least one light waveguide; an intermediate layer; a second layer of loose buffer tubes stranded around the intermediate layer, at least one of the loose buffer tubes of the second layer containing at least one light waveguide; and a jacket surrounding the second layer of loose buffer tubes; wherein the intermediate layer is formed of a material having a coefficient of friction of greater than 0.4, measured according to test method ISO 8295-1995.

2. The optical fiber cable of claim 1, wherein a thickness of the intermediate layer is between 0.3 mm and 0.5 mm.

3. The optical fiber cable of claim 1, wherein the first layer of loose buffer tubes is SZ stranded around the central strength member.

4. The optical fiber cable of claim 1, wherein the second layer of loose buffer tubes is SZ stranded around the intermediate layer.

5. The optical fiber cable of claim 1, wherein the intermediate layer is at least one of a binder, a tape, and an extruded material.

6. The optical fiber cable of claim 1, wherein material forming the intermediate layer is selected from the group consisting of thermoplastic material and thermoplastic rubber material.

7. The optical fiber cable of claim 1, wherein the central strength element is formed from fiber reinforced plastic.

8. The optical fiber cable of claim 1, further comprising water blocking swellable yarn stranded around the central strength member.

9. The optical fiber cable of claim 1, wherein at least 90% of the loose buffer tubes of the first and second layers contain at least one light waveguide.

10. The optical fiber cable of claim 1, further comprising at least one ripcord positioned between the first layer of loose buffer tubes and the intermediate layer.

11. The optical fiber cable of claim 1, further comprising at least one ripcord positioned between the second layer of loose buffer tubes and the jacket.

12. The optical fiber cable of claim 1, wherein an outer diameter of the loose buffer tubes of the first and second layers is less than 1.9 mm.

13. The optical fiber cable of claim 1, wherein a wall thickness of the loose buffer tubes of the first and second layers is between 0.2 mm and 0.5 mm.

14. The optical fiber cable of claim 1, wherein each loose buffer tube of the first and second layer contains at least 10 light waveguides.

15. The optical fiber cable of claim 1, wherein the light waveguides of the first and second layers are bend insensitive single mode optical fibers.

16. The optical fiber cable of claim 1, wherein the optical fiber cable contains no metallic components.

17. The optical fiber cable of claim 1, wherein an outer diameter of the optical fiber cable is between 8 mm and 12 mm.

18. The optical fiber cable of claim 1, wherein the number of loose buffer tubes in the first layer is between 6 and 10, and the number of loose buffer tubes in the second layer is between 12 and 20.

19. The optical fiber cable of claim 1, wherein the light waveguides of the first and second layers are coated with a UV curable resin and have a coated outer diameter of 250+/− 15 microns.

* * * * *